(12) United States Patent
Francis et al.

(10) Patent No.: US 9,610,511 B1
(45) Date of Patent: Apr. 4, 2017

(54) AMUSEMENT PARK RIDE VEHICLE INCLUDING A CHASSIS DRIVEN TO HAVE HEAVE AND SWAY MOTIONS

(71) Applicant: DISNEY ENTERPRISES, INC., Burbank, CA (US)

(72) Inventors: Dexter William Francis, Highland, UT (US); Larry S. McAfee, Stevenson Ranch, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/970,912

(22) Filed: Dec. 16, 2015

(51) Int. Cl.
*A63G 31/16* (2006.01)
*A63G 31/00* (2006.01)
*B60K 17/30* (2006.01)
*B62D 47/00* (2006.01)
*A63G 23/00* (2006.01)

(52) U.S. Cl.
CPC .............. *A63G 31/00* (2013.01); *A63G 23/00* (2013.01); *B60K 17/30* (2013.01); *B62D 47/00* (2013.01)

(58) Field of Classification Search
CPC .......... A63G 7/00; A63G 21/00; A63G 31/00; A63G 31/02; A63G 31/16; B65G 1/0428; B06S 13/02; B61J 1/10
USPC ....... 472/43, 59–60, 130; 104/53–56, 58–59, 104/63–65, 67, 68, 71, 74–76, 78–79, 50
See application file for complete search history.

(56) References Cited

U.S. PATENT DOCUMENTS

| | | | | |
|---|---|---|---|---|
| 5,772,513 A * | 6/1998 | Ohishi | ............ | A63F 13/08 434/55 |
| 6,095,926 A * | 8/2000 | Hettema | ............ | A63G 7/00 104/85 |
| 9,084,941 B1 * | 7/2015 | Fram | ............ | A63G 7/00 |
| 2009/0193997 A1 * | 8/2009 | Payne | ............ | A63G 21/06 104/53 |

\* cited by examiner

*Primary Examiner* — Kien Nguyen
(74) *Attorney, Agent, or Firm* — Marsh Fischmann & Breyfogle LLP; Kent A. Lembke

(57) ABSTRACT

A free-ranging ride vehicle for an amusement park ride. The vehicle includes a vehicle base supporting a passenger compartment. The vehicle includes a drive system with a support platform supporting the vehicle base. The drive system imparts a set of motions including translation, cornering, sway, and heave to the support platform and, in turn, to the vehicle base and passenger compartment. The drive system includes first, second, and third leg assemblies each with a rigid leg pivotally coupled at an inner end to the support platform and supporting a wheel at an outer end. Drive motors are mounted on the legs above the wheels to, independently and concurrently, rotate the wheels and change the directional offset angle of each wheel.

21 Claims, 9 Drawing Sheets

AMUSEMENT PARK RIDE VEHICLE INCLUDING A CHASSIS DRIVEN TO HAVE HEAVE AND SWAY MOTIONS

BACKGROUND

1. Field of the Description

The present description relates, in general, to amusement park rides and vehicles for such rides, and, more particularly, to a vehicle for use in amusement park rides that is adapted to have a selectively positionable (e.g., tiltable and/or pivotal) support frame. In use, a passenger compartment typically will be mounted on the support frame to be positioned in select angular orientations relative to horizontal with the support frame.

2. Relevant Background

In the amusement park industry, there is often a demand for new ride vehicle designs to support a particular ride designer's vision for a new ride and passenger experience. Recently, ride designers have been emphasizing trackless rides where the passenger vehicles are able to move about a ride space in a manner that the ride designer can choreograph to achieve a particular ride experience. Since the vehicle is not riding on a track, the passengers are allowed to believe that the vehicle is "free" to move in a widely varying pattern as it is in fact carefully controlled to follow a particular ride path chosen by the ride designer.

For example, rides have been designed and implemented in which each ride vehicle has a passenger compartment riding on a four-wheeled platform, with two powered, steerable, and/or fixed wheels and with two free-spinning/rotating casters. Such ride vehicles allow the vehicle to quickly rotate or spin about its central axis as the vehicles are moved in a trackless manner through a space. While meeting many of the demands of ride designers, such ride vehicles do not provide the full range of movement of the passenger compartment desired for many new envisioned amusement park rides.

Particularly, ride designers recently have begun to design amusement park rides or attractions that require a vehicle that has the capability of moving in ways to give the passengers a ride experience similar to that found in dancing, ice skating, and similar human or character activities. With this in mind, the challenge for a ride designer is to have a ride vehicle that can be operated to provide the passenger compartment with pitch, roll, yaw, sway, and heave. Further, the ride vehicle should be trackless such that it can have translation in any direction as well as rapid changes in direction, e.g., approximating a 90-degree or sharp cornered turn. Additional ride vehicle demands can further complicate this design challenge including the desired for a "bumper" on the vehicle to mitigate the effects of collisions between the vehicle and other vehicles or ride props/scenery.

Hence, there remains a need for new and improved ride vehicles to provide motion to the passenger compartment that can be accurately implemented and controlled, and it is preferable that these new designs be adapted to provide the passenger compartment with motions that simulate human dancing, ice skating, and the like by moving the passenger compartment with pitch, roll, yaw, sway, and heave.

SUMMARY

The present description provides a ride vehicle for use in amusement park rides using trackless vehicles. The ride vehicle includes a drive system that can be considered three-wheeled or three-legged as the drive system includes three leg (or wheel) assemblies that each includes an elongated strut or leg that is pivotally coupled with a support platform (or frame or chassis) at a first end to selectively lift or lower (e.g., provide heave to) the support platform. Since the three leg assemblies are coupled at spaced apart support points/mounting locations on the support platform (e.g., at 120-degree spacings about the periphery of the platform), the three leg assemblies can also be selectively and independently used to lift the support platform so as to impart sway to the support platform.

At a second end, each of the leg assemblies includes a drive wheel or castor that can be selectively driven by locally-mounted motors and motor power sources to rotate about their central axes and also to be rotated about a vertical axis (e.g., to provide drive steering of each of the three drive wheels or castors). In this way, the drive wheels can be operated to move the support platform in nearly any direction in the ride space (e.g., along a ride path defined by the vehicle in a ride program) with very sharp turns and with fully 360-degree rotation about the central axis of the support platform.

Each ride vehicle further may include a motion actuator such as one facilitating spin or, in some cases, a multiple degree-of-freedom (DOF) motion actuator (e.g., an actuator capable of producing the motions of a Stewart platform or other device such as pitch, roll, yaw, sway, and/or heave) mounted on the upper surface of the support platform or chassis, and the vehicle base (or a base plate) is coupled to the motion actuator to be moved by the motion actuator. A passenger compartment is included in each ride vehicle and affixed to an upper surface of the vehicle base so as to move with the vehicle base when the motion actuator is selectively operated such as by a control system of the amusement park ride. The combined movements provided by the drive system and the motion actuator can be used by a ride designer to move a vehicle through a ride space without a track and while imparting a wide range of motions to the passenger compartment including motions that simulate dancing, ice skating, and the like with sway and heave.

More particularly, a ride vehicle is provided for an amusement park ride using free-ranging vehicles. The vehicle includes a passenger compartment for receiving one or more passengers and a vehicle base supporting the passenger compartment. The vehicle includes a drive system with a support platform supporting the vehicle base. The drive system is operable to selectively impart a set of motions to the vehicle base via the support platform. The set of motions includes translational and cornering motions as well as sway and heave. In some implementations, the drive system includes first, second, and third leg assemblies each including a rigid, elongated leg pivotally coupled at an inner end to the support platform and supporting a wheel at an outer end. The three legs may extend outward from a center axis of the support platform and be offset from adjacent ones of the legs by 120 degrees.

The wheel is adapted for rotation about a vertical axis in each leg assembly, and the drive system further includes in each of the leg assemblies a drive motor for rotating the wheel about a vertical axis to define the translational and cornering motions. Additionally, the drive system further includes in each of the leg assemblies a drive motor for rotating the wheel about a central axis of the wheel to define a speed of the translational motion. The drive motors of each of the leg assemblies may be mounted on the outer end of the leg adjacent and vertically above the wheel.

The drive system may further include in each of the leg assemblies a battery set, for powering the drive motors, mounted on the leg between the inner and outer ends. Additionally, each of the drive motors in each of the leg assemblies can be independently and concurrently operable to provide heave and sway to the passenger compartment via the support platform. A spring/damper may be inserted between the outer extent of each leg assembly and vehicle base to assist the tractive drive forces required to accomplish the heave and sway motions. The vehicle may optionally further include a motion actuator coupled to the vehicle base (and supported on the support platform) that is operable to selectively impart an additional set of motions to the vehicle base.

DETAILED DESCRIPTION

A ride vehicle is taught for use in trackless or free-ranging vehicle amusement park rides. The ride vehicle is configured to provide motions for a passenger compartment (or vehicle body with one to many passenger seats) that include pitch, roll, yaw, sway, and heave in addition to translation in any direction and rapid changes in direction approximating 90-degree or sharp-cornered turns. It will be understood in the following description that "sway" can be defined as a side-to-side swinging or sweeping motion and, in such cases, may not be considered a discrete motion but, instead, a combined motion of roll and lateral translation.

In brief, the ride vehicle combines a drive system with a motion actuator assembly. The drive system has a compliant suspension configured to provide sway and heave to the passenger compartment as well as the desired translation and rapid direction changes, and the motion actuator assembly may provide 6 DOF motion (such as through the use of a Stewart platform or similar actuator mechanism, but it will be understood the present design does not require a Stewart platform or even a motion actuator assembly). The compliant suspension is achieved through the use of a support platform or chassis that is pivotally coupled to the legs or struts of three leg (or wheel) assemblies, and each leg assembly includes an elongated leg or strut that at an opposite end has a frame supporting a drive wheel or castor, drive motors for rotating the wheel/castor about its center axis and also about a vertical axis (for drive steering), and a power source (e.g., a set of batteries). Each of the wheels/castors may be independently driven in conjunction (in some embodiments) with a spring assist to impart both heave and sway to the support platform/chassis, and the motion actuator assembly is mounted on an upper surface of the support platform/chassis to move in heave and sway with this platform/chassis. Additionally, the ride vehicle includes a vehicle base supported and actuated by the motion actuator assembly, e.g., with pitch, roll, yaw, sway, and heave, and the passenger compartment is affixed to the vehicle base to have motion that is a combination of movements provided by the support frame (which is moved by the drive system) and by the vehicle base (which is moved by the motion actuator assembly).

Figure 1:
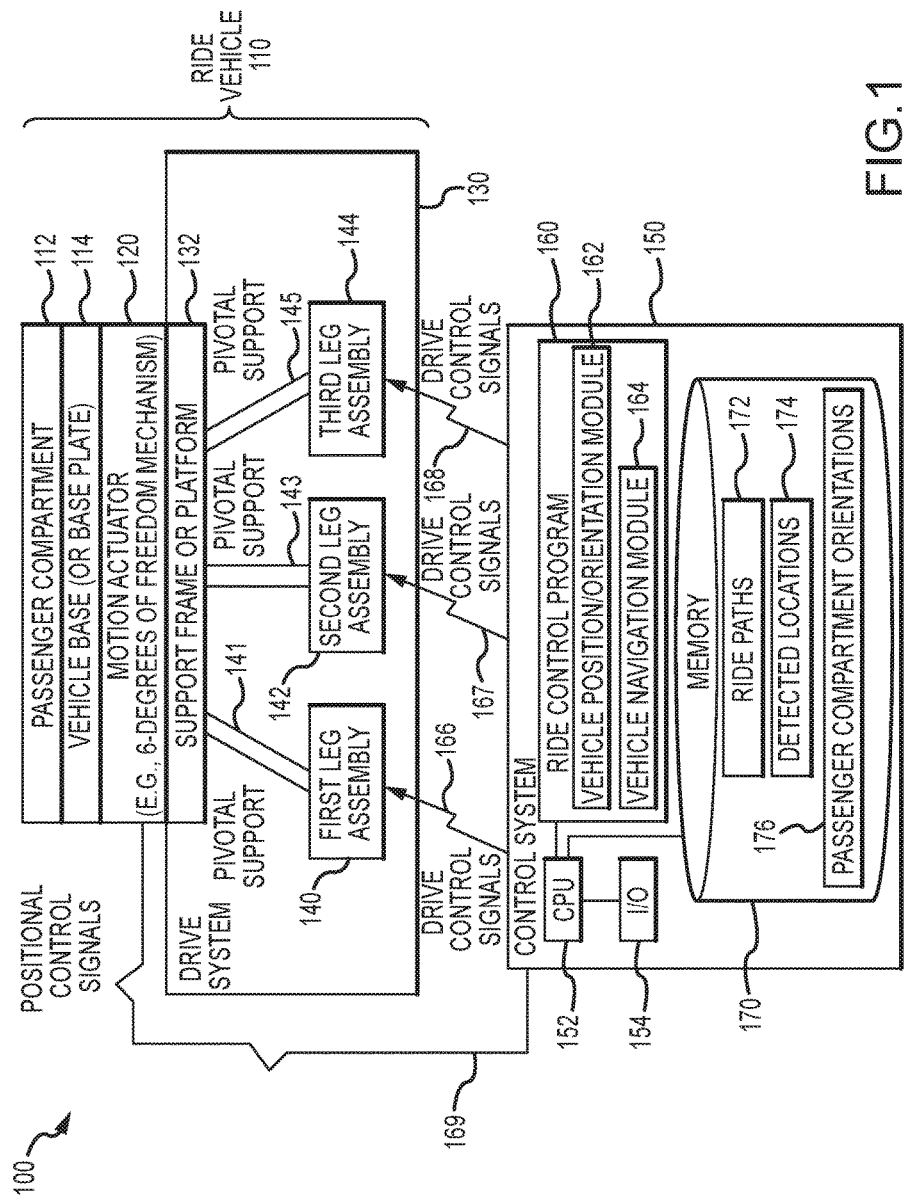
FIG. 1 is a functional block diagram or schematic illustration of a portion of an amusement park ride showing an exemplary ride vehicle of the present description.

Prior to turning to particular implementations of the ride vehicle and its components, it may be useful to discuss an amusement park ride and ride vehicles for this ride in more general terms. FIG. 1 illustrates a portion of an amusement park ride 100 that is adapted for free-ranging or trackless vehicles over a ride space or along a ride path such as ride vehicle 110. As shown, the ride vehicle 110 includes a passenger compartment 112 that may include a body with one to eight or more seats (along with passenger restraints) for vehicle passengers. The passenger compartment 112 is mounted, typically rigidly, onto a vehicle base or base plate 114 so as to move with the vehicle base 114 during operation of the ride 100. The vehicle base 114 may be similar in shape to lower portions of the passenger compartment 112 or may take another shape such as a circular turntable shape or a rectangular shape readily suited for mating with drive components of a motion actuator such as actuator 120.

The ride vehicle 110 includes a motion actuator 120 coupled with the vehicle base 114 (e.g., with the base plate 114 underside) and adapted for responding to position control signals 169 to move the vehicle base 114 and attached passenger compartment 112 through desired motions. The motion actuator 120, which is optional in some embodiments, may be a 6 DOF motion actuator assembly that can be used (e.g., by control system 150) to impart a range of motions to the base 114 and compartment 112 including pitch, roll, yaw, sway, and heave.

Significantly, the ride vehicle 110 further includes a drive system 130, and the drive system 130 may be thought of as including a support frame or chassis 132 upon which the motion actuator 120 is mounted. In this way, the motion actuator 120, vehicle base 114, and passenger compartment 112 are all supported in the ride vehicle 110 upon or by the support frame 132, and, more significantly, this arrangement is useful for causing the vehicle base 114 and passenger compartment 112 to not only be actuated with motion by the motion actuator 120 but also to have movements defined by the drive system 130 via motion of the support frame or platform 132. Particularly, the drive system 130 is adapted to provide translation in nearly any direction in a ride space including the system 100 while also providing rotation about the center axis of the support frame/platform 132 and sharp cornering.

To this end, the drive system 130 includes three leg assemblies 140, 142, 144 that are each pivotally coupled to the support frame/platform 132 to provide pivotal support 141, 143, 145, respectively, of the support frame/platform 132 and, in turn, the vehicle base 114 and passenger compartment 112. Each of the leg (or wheel) assemblies 140, 142, 144 may take a similar form such as by including an elongated leg or strut with a first end pivotally coupled to the support frame 132 (e.g., to a lower surface of the frame 132 such as with a bearing, a rotating pin/axle mechanism, or the like). A frame may be provided at the other end of the leg or strut, and this frame may be used to support a wheel/castor along with a motor driving rotation of the wheel/castor about its center axis and a motor driving rotation (drive steering) of the wheel/castor about its vertical axis (e.g., to set the wheel/castor offset angle). This frame may also be used to carry/secure a power source for these two drive motors such as by supporting one or more batteries.

The wheels/castors of the three leg assemblies 140, 142, 144 can be driven to provide translation in the ride space for the support frame 132 and attached passenger compartment 112, to rotate the platform 132 about its center axis, and so on. These same three wheels/castors can be driven concurrently inward or outward from the center axis of the support frame/platform 132 to lift or lower the support frame/platform 132 and, in turn, the passenger compartment 112 (e.g., to provide heave). During such movement, the support platform 132 may be retained in a horizontal orientation relative to the ride space surfaces upon which the vehicle 110 is riding. Also, during such movement, the leg or strut of each assembly 140, 142, 144 pivots about its first or inner end that is pivotally coupled (as shown at 141, 143, 145) to the support frame/platform 132.

In contrast, driving the wheels/castors toward the center axis of the platform 132 in an unequal manner (e.g., via independent driving of the leg assemblies 140, 142, 144) can be used to impart sway to the support frame/platform 132 and supported passenger compartment 112. In other words, the frame/platform 132 and passenger compartment 112 are not retained in a horizontal orientation but instead are tilted in any direction through a range of angles (e.g., 0 to 45 degrees or the like). In some embodiments, the leg assemblies 140, 142, 144 are arranged in the drive system 130 so as to provide the pivot supports 141, 143, 145 at three equally spaced-apart location/mounting positions on the support frame or platform 132. For example, a circle (e.g., a circle with a diameter in the range of 30 to 75 percent of the outer diameter/periphery of the frame/platform 132) may be drawn on the bottom surface of the support frame/platform 132 that includes each of the mounting points for pivotal supports 141, 143, 145, and each of these mounting points may be separated by 120 degrees.

The ride 100 further includes a control system 150 that operates during operations of the ride 100 to generate and communicate (e.g., in a wireless manner) drive control signals 166, 167, 168 to the three leg assemblies 140, 142, 144 and also position control signals 169. In this manner, translational and turning motions of the support frame/platform 132 are defined by the control system 150 via signals 166, 167, 168 as are heave and sway movements of the support frame 132. The position control signals 169 may additionally operate the motion actuator 120 to impart additional motion to vehicle base 114 and passenger compartment 112 such as to provide pitch, roll, yaw, sway, and heave (additional heave additive with heave of support frame/platform 132 by leg assemblies 140, 142, 144).

To provide these signals 166, 167, 168, 169, the control system 150 is shown to include a processor 152 that operates to manage input/output (I/O) devices 154 and manage operations of memory (e.g., computer readable media) 170. Further, the processor 152 acts to execute or run software or code or instructions to provide a ride control program 160 that generates the control signals 166-169. The I/O devices 154 may be operated by a user/operator (not shown) to select ride paths 172 for the vehicle 110 and other vehicles of ride 100 and to initiate the ride control program 160.

The control program 160 may include a vehicle navigation module 164 that uses the ride paths 172 as input to impart translational movement of the vehicle 110 through a ride space, and using detected locations 174. For example, magnets and/or radio frequency identification (RFID) tags may be embedded in a grid or other pattern in the ground/ride surface, and RFID or other readers/sensors may be provided on the vehicle 110 and used to provide location information 174 to the control system 150. The navigation module 164 may compare these locations 174 with the ride path 172 for the vehicle 130 in the space and generate control signals 166, 167, 168 to operate the leg assemblies 140, 142, 144 of the drive system 130 to move the vehicle 110 along (or near) the ride path in the ride space. Alternatively, the vehicle 130 may include sensors for detecting objects around the vehicle 130, and this data can be processed by the navigation module 164 to determine current vehicle locations 174. The detected locations 174 can then be compared to desired vehicle locations 172 in the space to provide visual navigation through generation of the drive control signals 166, 167, 168. The signals 166, 167, 168, in brief, can be used by the ride control program 160 to set the speed of the vehicle 130 (e.g., through rotation rates for the wheels/castors about their central axes with drive motors) and also to set the direction of movement for turns, rotation in place, and the like (e.g., through rotation of the wheels/castors about their vertical axes with another set of drive motors or to set the offset angle of each wheel or castor).

Further, the ride control program 160 includes a vehicle position/orientation module 162 that operates to process sensor information from sensors (not shown) on the ride vehicle 110 to determine a current orientation/position of the passenger compartment (as shown being stored at 176 in memory 170). The ride control program 160 may be configured to set a series of motions for the passenger compartment 112 as it follows the ride path 172. The module 162 may operate to control both the drive system 130 via control signals 166, 167, 168 to the leg assemblies 140, 142, 144 and the motion actuator 120 via control signals 169 to impart these motions to the passenger compartment 112 (such as with comparisons of the present orientations/positions 176 with desired orientations defined in the program 160 to determine a next desired movement). These motions may include sway and heave imparted to the support frame/platform 132 (and, hence, to interconnected passenger compartment 112) by the leg assemblies 140, 142, 144 and concurrently or separately pitch, roll, yaw, sway, and heave imparted to the vehicle base 114 (and, hence, to interconnected passenger compartment 112) by the motion actuator 120.

Figure 2:
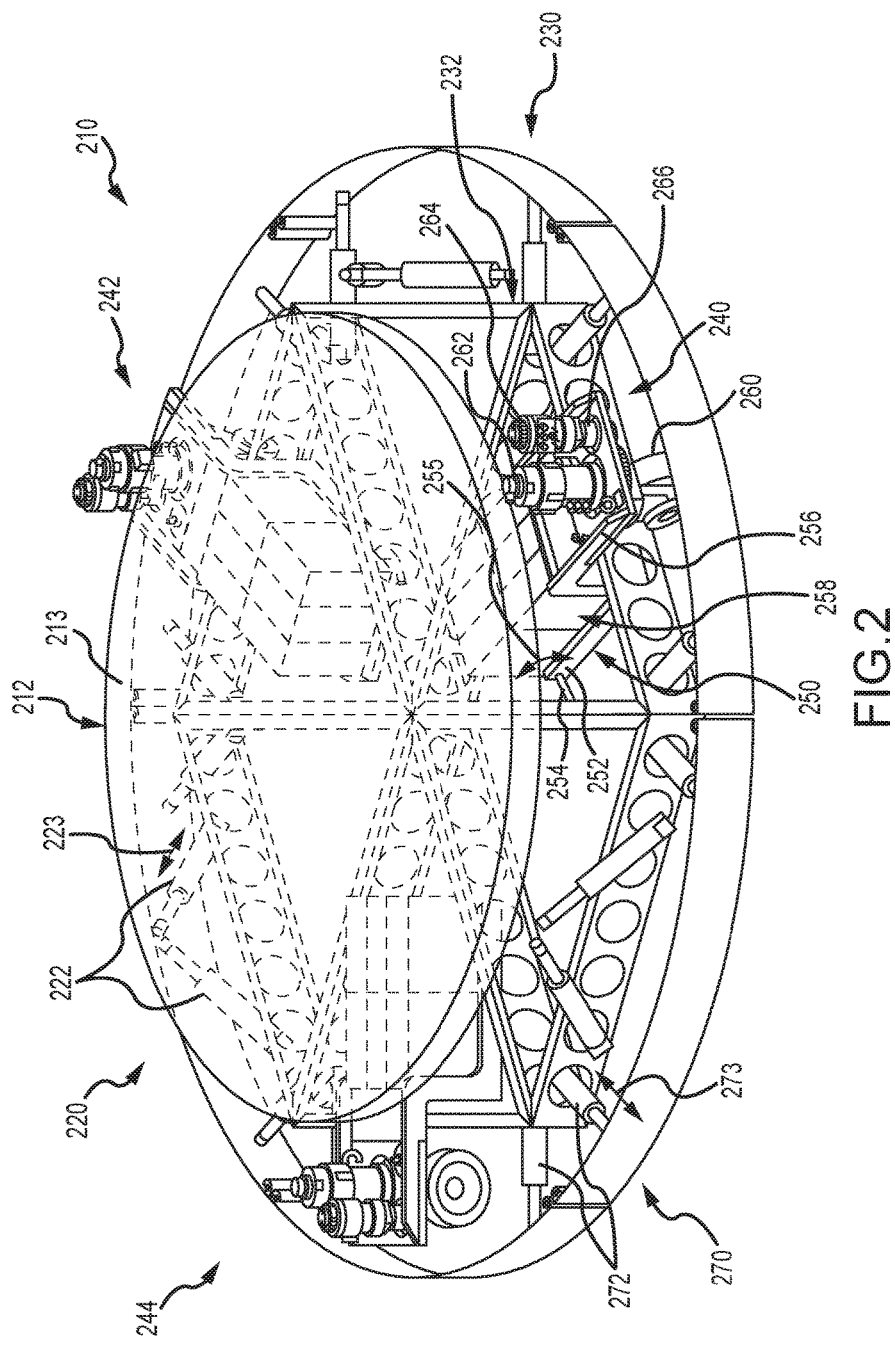
FIG. 2 illustrates a partial top perspective view of a ride vehicle of the present description with the upper vehicle base showing transparent to reveal lower components of the drive system and with only a partial display of motion actuator components for ease of illustration.

FIG. 2 illustrates a partial top perspective view of a ride vehicle 210 of the present description, such as may be used to implement vehicle 110 of ride 100 of FIG. 1. In FIG. 2, the ride vehicle 210 is shown to include a circular vehicle base (or base plate) 212, and this is show to be transparent/ translucent so as to reveal lower components of the drive system 230, while in practice this typically will be a solid, opaque member that hides lower portions of the ride vehicle 210. While not shown in FIG. 2, a passenger compartment typically would be mounted on the upper surface 213 of the vehicle base 212 so as to move with any motion imparted to the vehicle base 212. In this regard, the ride vehicle 210 is shown to include a motion actuator 220 in the form of a Stewart platform, and FIG. 2 is simplified as it only shows the six actuators/hydraulic jacks 222 that provide linear movement 223 and impart motions to the vehicle base 212 without details of their mounting devices, support systems (e.g., hydraulic system), controls, and the like as these will readily be understood with those familiar with Stewart platforms.

The actuators 222 of the Stewart platform-type motion actuator 220 are connected at upper or first ends to a lower surface of the vehicle base 212 (e.g., a surface opposite the compartment-mating upper surface 212) and at lower or second ends to a support platform or chassis 232 of a drive system 230. In this way, the actuators 222 can be operated as shown with arrow 223 to impart motion (e.g., pitch, roll, yaw, sway, and heave) to the vehicle base 212 while also having other motion (e.g., translation, sharp cornering, heave, and sway) imparted to it and, therefore, to the vehicle base 212 with movement of the support platform or chassis 232.

The drive system 230 is shown to include the support frame or chassis 232, which may take a hexagonal configuration as explained in more detail below with reference to FIG. 3 to provide a higher strength frame but with less weight that would be required for many other designs. The components of the motion actuator 220 are supported, such as on upper surfaces, by the support frame/chassis 232. The drive system 230 is also shown to include a bumper 270 in the form of a circular band or ring about the periphery of the support frame 232, and the bumper 270 is coupled with the support frame 232 with a plurality of suspension elements (such as pneumatic, hydraulic, or mechanical shock absorbers, spring members, or the like) 272 that each can be compressed as shown with arrows 273 some amount when a compressive force is applied to them via the bumper 270, e.g., when the vehicle 210 collides with another vehicle or ride prop/scenery element. The suspension elements 272 may number three, four, or more and be spaced about the periphery of the support frame 232 to provide the shock-absorbing support of the bumper 270.

The drive system 230 further includes three leg (or wheel) assemblies 240, 242, 244 that are each pivotally coupled at spaced apart (e.g., 120-degree spacing) locations to the support frame. With reference to leg assembly 240, it can be seen the assembly 240 includes a "leg" or elongated strut in the form of a Z-shaped frame 250. A first or inner end 252 of the frame 250 is pivotally connected to the support frame/chassis 232 with a pivotal coupling mechanism 254 (e.g., an axle extending through the frame end 252 and attached with bearings (not shown) to the support frame/chassis 232). The forward end 252 of the frame/leg 250 is configured to support the power source 258 for drive motors such as a set of batteries when the motors are electric motors. This places weight of the batteries 258 on the leg/frame 250 near at a central location to provide a more centrally-located center of mass/gravity for the vehicle 210 such that it is more stable.

The leg assembly 240 further includes a wheel or castor 260 supported on a lower portion or surface of the outer or second end of the frame 250. A first drive motor 262 is mounted on an upper portion or surface of the outer or second end of the frame 250, e.g., immediately above the wheel or castor 260, and the first drive motor 262 is adapted to drive (in response to control signals) to rotate at a desired rate about the central or rotation axis of the wheel/castor 260. Further, a second drive motor 264 is mounted on the upper portion or surface of the outer or second end of the frame 250 (again, above the wheel or castor 260). The second drive motor is adapted to rotate (in response to control signals) the wheel or castor 260 about its vertical axis to set its offset angle or provide drive steering, e.g., to allow the vehicle 210 to take sharp corners, to rotate about the center axis of the support platform/chassis 232, and so on. Encoders 266 are also provide near these motors 262, 264 to provide measurement/sensing of the angle of the castor/wheel 260 and speed of rotation of the castor/wheel 260, which may be used by a controller to modify and/or generate control signals for the drive motors 262, 264.

The drive vehicle 210 is shown with the platform 232 in a lowest, level orientation. With the wheels all turned inward toward the center axis of the platform 232, operation of the drive motor 262 of each leg assembly 240, 242, 244 to rotate the wheel 260 of each leg assembly 240, 242, 244 in a concurrent manner imparts tractive force that will cause the frame 250 of each assembly 240, 242, 244 to pivot 255, which lifts the support frame 232 (and motion actuator 220 and vehicle base 212) upward to impart a heave motion on the support frame 232 and any passenger compartment that may be on the vehicle base 212. Unequal inward or outward movement of the wheel 260 of the leg assemblies 240, 242, 244 will cause the support platform 232 and interconnected vehicle base 212 to sway (e.g., be tilted in a desired direction by selection of which leg assembly 240, 242, 244 moves further inward toward the central axis of the support platform 232).

The inventor recognized that, in addition to providing the legs or struts with a configuration to provide a stable vehicle (e.g., with motors over the wheels/castors and batteries on the leg frame), it would be desirable to provide a chassis or support frame design that would provide high structural strength while also being lightweight and easy to manufacture and assemble. To this end, the inventor determined that it may be useful to provide, as shown in FIG. 2 with chassis/platform 232, a chassis with a body that has a hexagonal outer shape.

Figure 3:
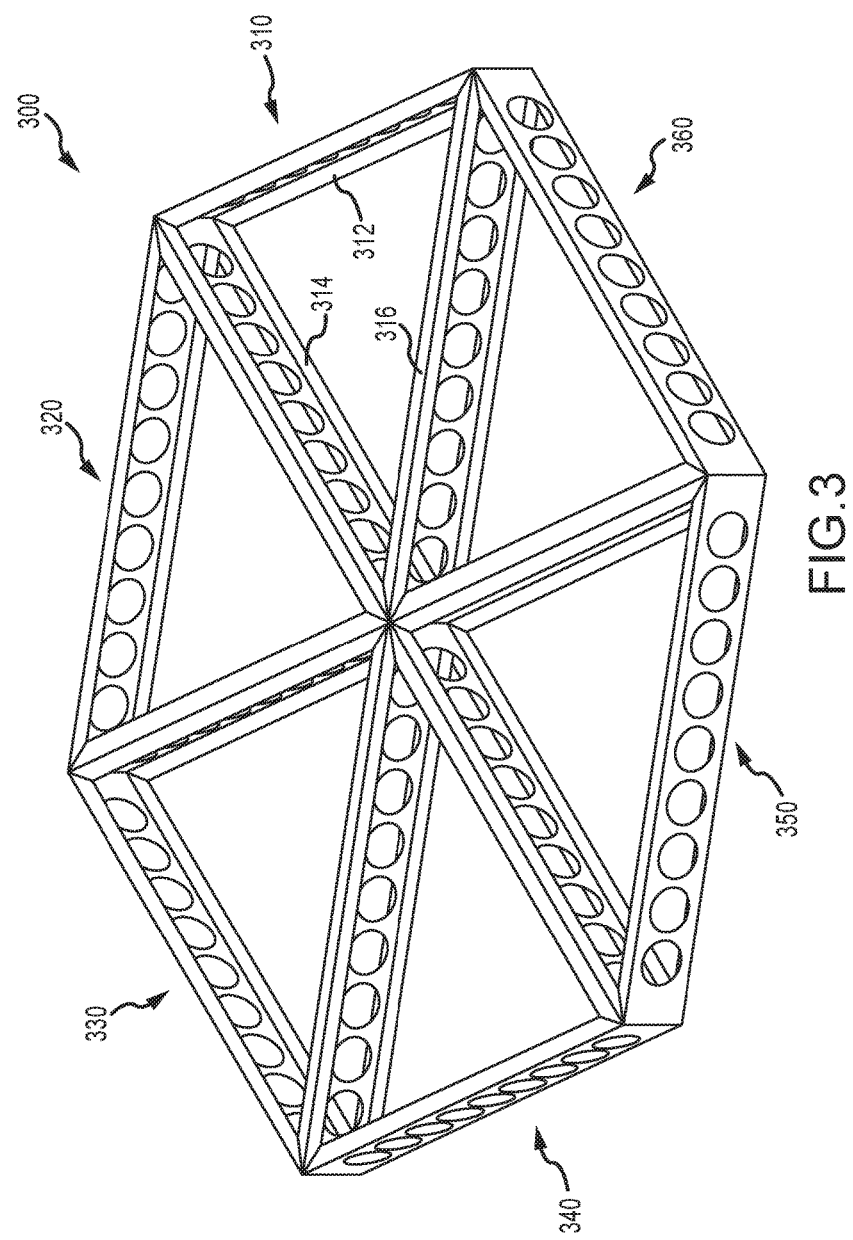
FIG. 3 illustrates a top perspective view of one embodiment of a support platform or chassis for use in the ride vehicles of the present description and is used for pivotally coupling with the leg assemblies and for supporting the motion actuator.

In this regard, FIG. 3 illustrates one embodiment of a support platform or chassis 300 for use in the ride vehicles of the present description for pivotally coupling with the leg assemblies and for supporting the motion actuator. The chassis 300 is designed to be fabricated in a modular manner with six identical structural subassemblies 310, 320, 330, 340, 350, 360. As shown with subassembly 310, these subassemblies may be formed as equilateral triangles with three joists or beams 312, 314, and 316 (which may be solid members made of steel or the like or have gaps/holes as shown to reduce their weight) of equal length, with adjacent pairs rigidly coupled at their ends. Then, the six equilateral triangle subassemblies 310, 320, 330, 340, 350, and 360 may be arranged as shown (e.g., as pie wedges) to form a planar body of the chassis 300 with outer joists/beams (or legs of the triangles) providing the six outer members or walls of the hexagonal shaped chassis 300 or chassis body. It is believed that while the body of chassis 300 includes many spaces (i.e., is not typically provided as a solid member) that the arrangement shown will have very high strength relative to its weight and be useful in nearly all embodiments of the ride vehicles taught herein.

Figure 4:
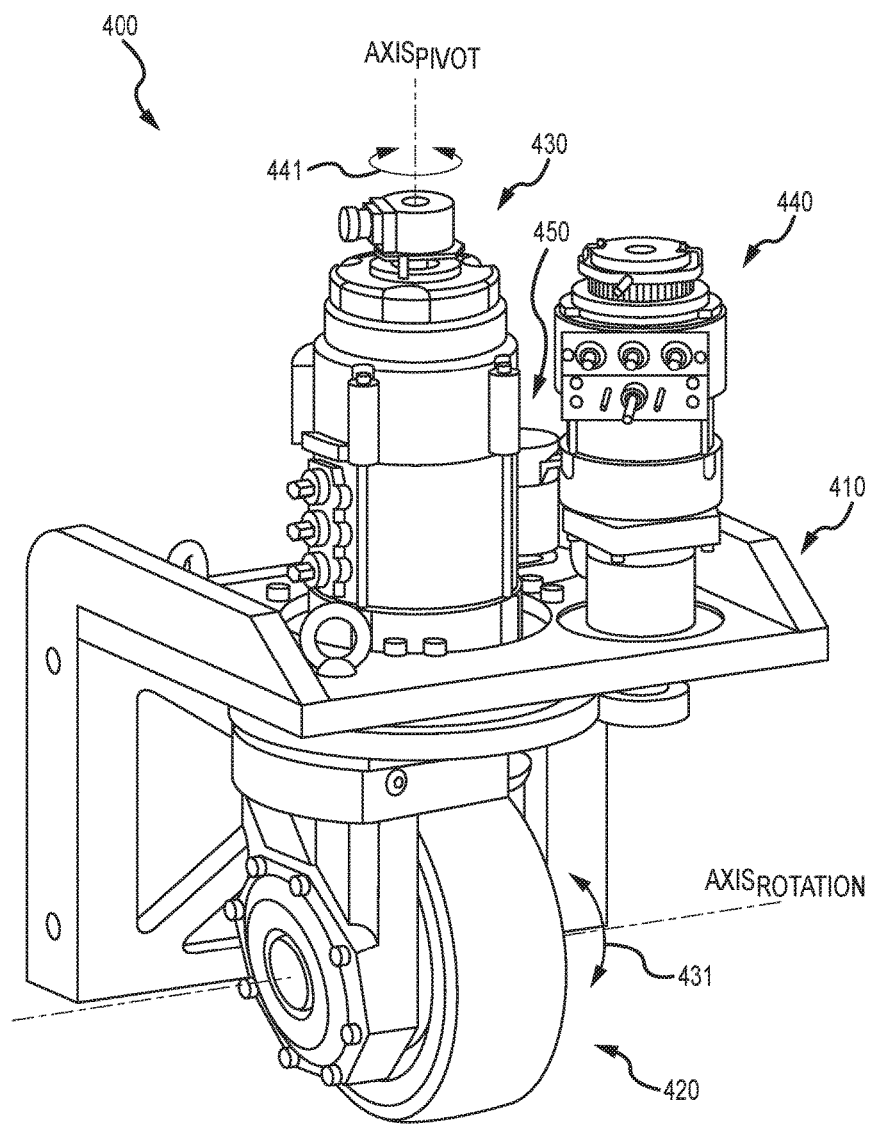
FIG. 4 is a side perspective view of a portion of a leg (or wheel) assembly of a drive system of a ride vehicle of the present description showing drive components in greater detail.

FIG. 4 is a side perspective view of a portion of a leg (or wheel) assembly 400 of a drive system of a ride vehicle of the present description showing drive components in greater detail, and, in practice, the leg assembly 400 may be affixed to an end of an elongated leg or strut such as at the outer end of Z-shaped leg 250 of the assembly 240 in FIG. 2. As shown, the leg assembly 400 includes a wheel support 410 that is an L-shaped frame configured for mounting to an end of a leg/strut (not shown in FIG. 4 but may be in form of leg/strut 250 in FIG. 2) and also for supporting and positioning a wheel/castor 420. The wheel/castor 420 may take many forms to practice the leg assembly 400 such as a wide wheel with a rubber/plastic tread for providing traction on a particular ride space surface/floor while being durable for long life.

The wheel/castor 420 is provided on an arm extending outward from a first drive motor 430. Operation of the motor 430 (e.g., an electric drive motor) causes the wheel/castor 420 to rotate about its center axis, $Axis_{Rotation}$, as shown by arrows 431. In the shown position, the wheel/castor 420 may be thought of as having an orientation defined by an offset angle of 0 degrees such that rotation 431 will cause the wheel/castor 420 to be driven either inward toward the center axis of a support frame to which the leg supporting the wheel/castor 420 is mounted or outward from this center axis. In this way, the motor 430 can be operated to lift the support frame or chassis or to lower the support frame or chassis so as to impart heave and/or sway to a passenger compartment supported upon or interconnected with the support frame or chassis (depending upon concurrent operations of the two other leg assemblies that may take a form matching or similar to leg assembly 400 in a ride vehicle).

To adjust or set the offset angle of the wheel/castor 420, the leg assembly 400 further includes a second drive motor (e.g., an electric motor) 440 that is along with the first drive motor 450 mounted on an upper surface of the wheel support 410. When the second drive motor 440 is operated, the wheel or castor 420 is caused to rotate, as shown with arrows 441, about its vertical axis, $Axis_{Pivot}$, which causes the offset angle to change from 0 degrees to another positive or negative offset angle (e.g., rotation 441 may be in either direction in response to driving by motor 440). In this way, a ride vehicle with three of the wheel/leg assemblies 400 can provide translation in any direction and can move quickly through 90-degree and other sharp corners/turns. The leg assembly 400 also includes an encoder (or other similar device) 450 for sensing the speed or rate of rotation 431 of the wheel/castor 420 and also the offset angle of the castor/wheel 420 as set by the motor 440. The arrangement of assembly 400 shown in FIG. 4 is useful for positioning the motors 440, 450, which can be relatively heavy, directly above (or nearly so) the wheel 420 throughout the operations of a ride vehicle (e.g., through heaving and sway motions). This is desirable to retain good traction and for providing a stable vehicle with reduced risks of tipping or other operating issues.

Figure 5:
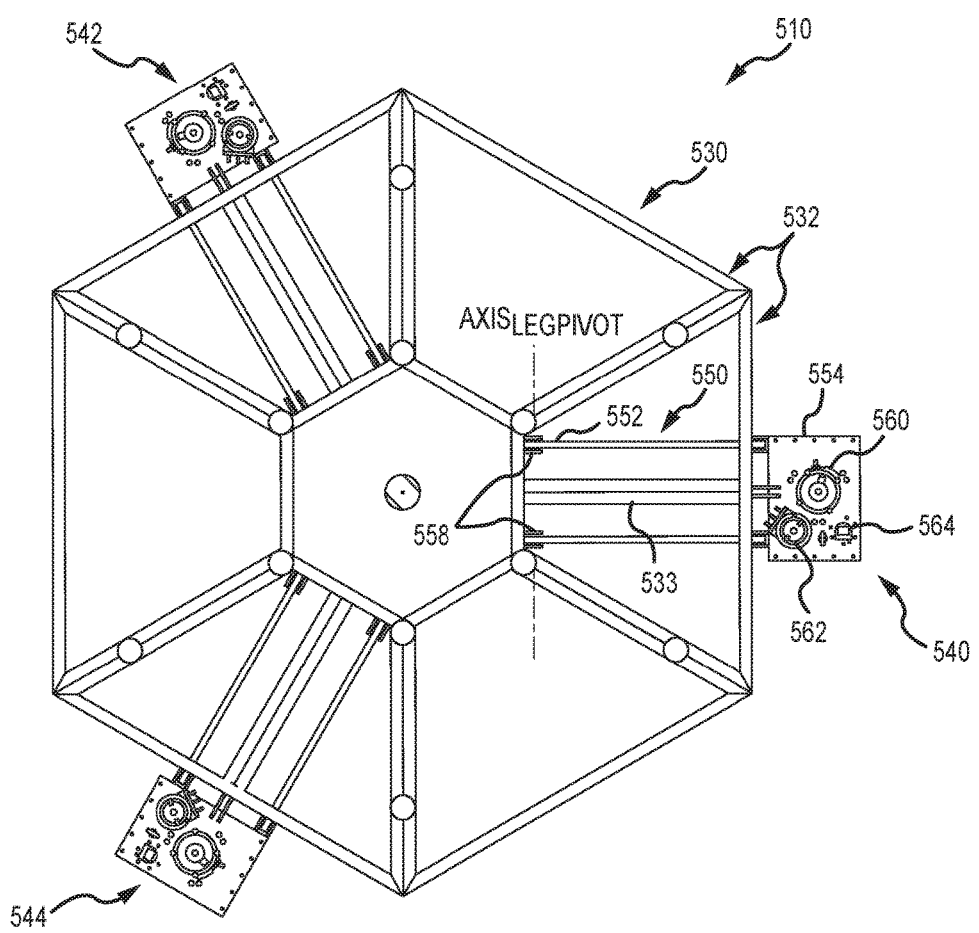
FIG. 5 is a top view of another embodiment of a drive system for a ride vehicle of the present description.

FIG. 5 is a top view of another exemplary embodiment of a drive system 510 for a ride vehicle of the present description. In other words, the drive system 510 may be used with the motion actuator 220 and the vehicle base 212 of the vehicle 210 of FIG. 2 along with a passenger compartment (such as compartment 112 of the system 100 of FIG. 1). As shown, the drive system 510 includes a hexagonal support platform or chassis 530 that is designed to be fabricated and assembled in a modular manner. Particularly, the platform 530 includes six quadrilateral structural subassemblies 532 that when assembled as shown (in a pie pattern) produce a planar body or full platform 530 with outer walls/sides in a hexagonal pattern and, in contrast to the chassis 300, a hexagonal-shaped inner void space or opening (e.g., the center axis of the platform 510 passes through the center of this void space defined by inner walls of the assembled subassemblies 532).

The drive system 510 also includes three leg (or wheel) assemblies 540, 542, 544 that are pivotally coupled with or mounted onto the hexagonal-shaped chassis 530 such as along or near the inner walls/sides of the subassemblies 532 near the inner hexagonal void space or opening. The leg assemblies 540, 542, 544 are mounted to the chassis 530 so as to extend radially outward from the center axis of the chassis 530 at offset angles of 120 degrees. Each of the leg assemblies 540, 542, 544 is separately operable to impart a wide range of sway motions to the chassis 530, and the leg assemblies 540, 542, 544 may also be operated wholly or partially concurrently in a like manner to lift or lower the chassis 530 so as to impart a heave motion to the chassis 530. For example, each leg assembly 540, 542, 544 may be operated to raise the chassis 530 a predefined amount (such as several inches to several feet) or one or more of the assemblies 540, 542, 544 may be operated to raise the chassis 530 a differing amount to impart sway or tilting (e.g., one or two may raise the chassis 0 to several inches (e.g., 4 to 8 inches or the like may be useful in many ride uses) or several feet but some amount that is smaller than the other one or two assemblies 540, 542, 544).

It may be useful to look at exemplary leg assembly 540 in more detail to understand its design and also the configuration and operation of the other two assemblies 542, 544. As shown, the leg assembly 540 includes an elongated leg or strut 550 extending outward from the center of the chassis 530 from a first or inner end 552 to a second or outer end 554. Pivotal coupling elements 558 are provided at the first or inner end 552 to pivotally couple the leg or strut 550 to the chassis 530. As a result, a driving of the leg 550 inward tends to lift the chassis 530 while a driving of the leg 550 outward from the center axis of the chassis 530 tends to lower the chassis 530 (e.g., tends to move the chassis 530 from a first lower state to a second higher state and vice versa), and equal movements of all legs causes the platform/chassis 530 to remain parallel to horizontal and unequal movements causes tilting or a sway motion to be imparted to the chassis 530.

The other end 554 of the leg or strut 550 is not attached to the chassis 530 and can move freely relative to the chassis subassemblies 532. However, in some embodiments, a shock absorber or cushioning member/pad may be provided on either (or both of) the upper surface of the leg 550 or lower surface of the outer wall of the subassembly 532 to absorb contact/impact forces when/if the leg 550 and chassis come into contact (such as at a lowest height setting (e.g., when the chassis 530 is level and fully lowered by the leg assemblies 540, 542, 544)). Such shock absorbers or cushioning members/pads may be chosen to assist in the definition of this lowest height and provide adjustability to retain the chassis' upper surfaces substantially level and parallel to the ride space surface or floor supporting the drive system 510 when in use.

Figure 6:
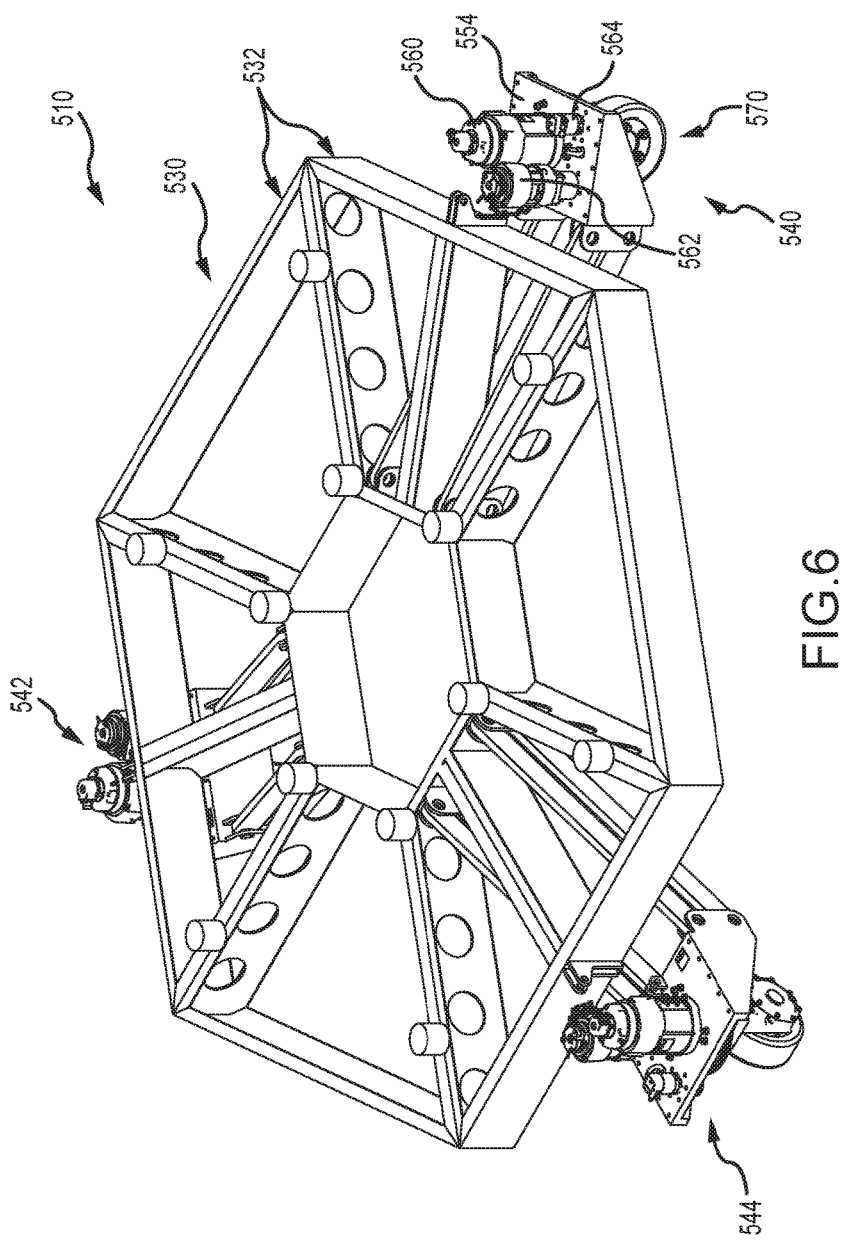
FIGS. 6 and 7 illustrate top perspective and side views, respectively, of the drive system of FIG. 5.

On the leg 550 at or near the second or outer end 554 (which may be shaped as or further include a wheel support (such as shown in FIG. 4 with element 410)), a first drive motor 560 is provided for driving/rotating a wheel or castor (shown as element 570 in FIG. 6). Also, at or near the outer end 554 of the leg 550, a second drive motor 562 is provided that can be selectively operated (such as by a control system as shown in FIG. 1) to rotate or pivot the wheel/castor 570 about its vertical (or near vertical) axis to define an offset angle to direct translational and cornering and sway-imparting movement of the ride vehicle that includes the drive system 510. Additionally, an encoder 564 or similar device(s) is provided for measuring wheel rotation rates and the present offset angle for the wheel/castor 570 and to provide this information to a control system on or offboard the drive system 510. While not shown, batteries for powering the motors 560, 562 and encoder 564 typically would also be mounted on the leg or strut 550 such as inboard from the motors 560, 562 (which are placed vertically over the wheel/castor 570) but more proximate to the end 554 than the inner end 552 in most cases. With this arrangement of the motors 560, 562 on same frame/leg as batteries, translation is facilitated (e.g., by providing relatively heavy drive components over suspension components) as is stability (e.g., not changing center of gravity (to any large amount) from central area of ride vehicle (or support platform 530)).

Figure 7:
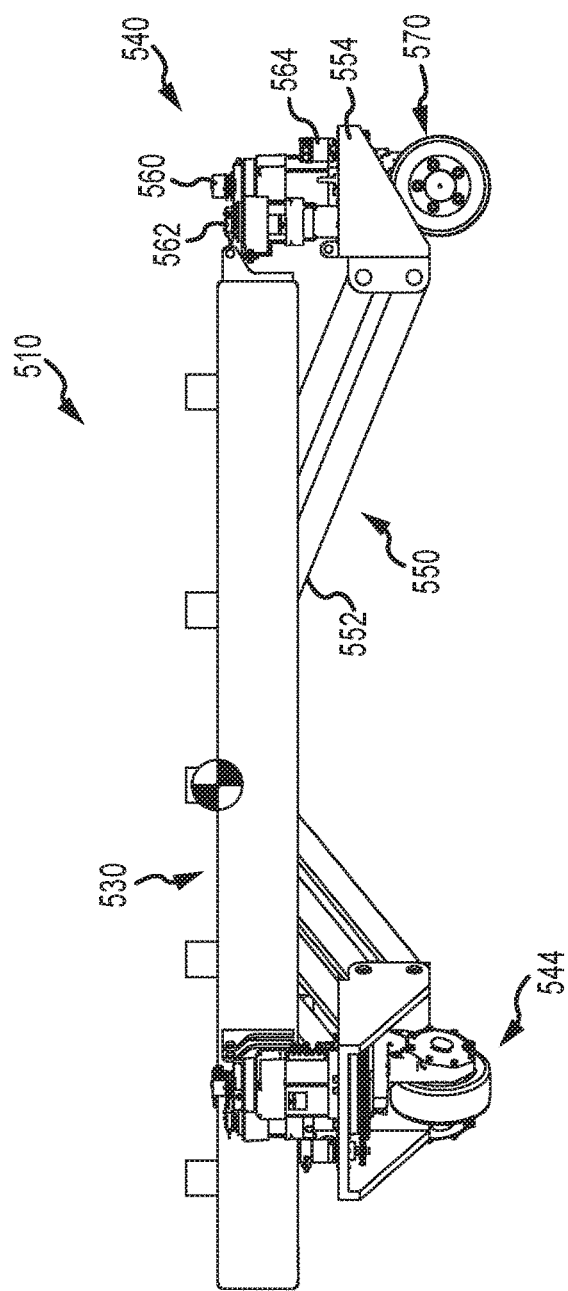

FIGS. 6 and 7 illustrate the drive system 510 from top perspective and side views, respectively, to provide further detail of the components of system 510. In this embodiment of the drive system 510, FIGS. 6 and 7 are useful for illustrating that the chassis 530 is level with its upper surface (which is planar in this example) being parallel to the surface or floor or ground supporting the drive system 510. This may be the lowest height or lowest (initial, in some cases) operating state for the drive system 510, with the leg assemblies 540, 542, 544 each operated to have their wheel (e.g., wheel 570 of assembly 540) at a maximum operating radius to define the lowest height for the chassis 530. The wheels 570 are all shown to be at a 0-degree offset angle such that rotation would cause the second or outer ends of the leg assemblies to move toward the center axis of the chassis 530, and the legs would rotate or pivot about the first or inner ends so that the legs would lift the chassis 530 upward to new heights greater than the lowest/initial height shown in FIGS. 6 and 7. Equal amounts and rates of wheel rotation will retain the chassis in its level (but higher) state parallel to the ground while unequal amounts or rates of wheel rotation will cause tilting from level in a particular direction for the chassis 530 (or a sway motion).

Figure 8:
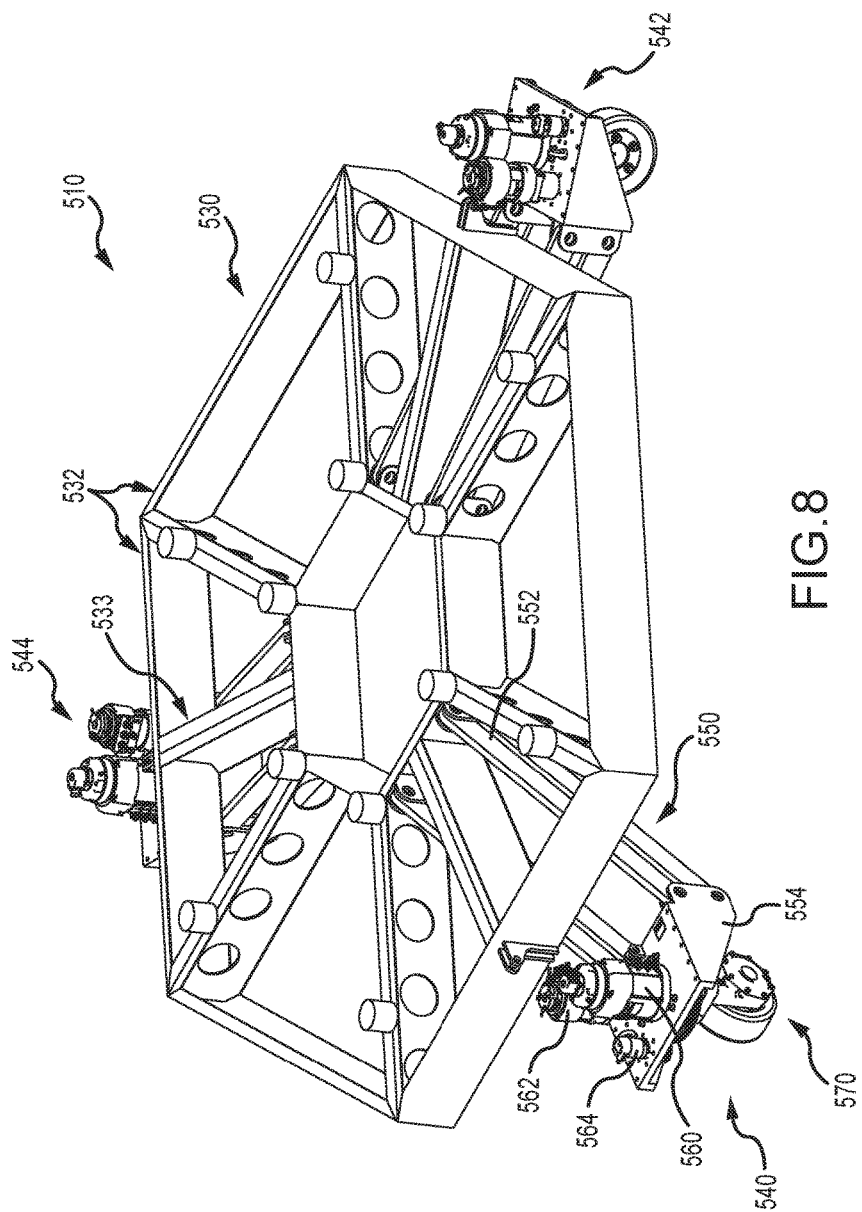
FIGS. 8 and 9 illustrate top perspective and side views, respectively, of the drive system of FIGS. 5-7 after its operation to articulate or tilt the chassis to a second position or orientation (e.g., to impart a sway motion to the chassis and, in a ride vehicle, a passenger compartment that would be supported by the chassis); note, FIG. 9 does not show a spring/damper assist component/assembly that may be provided in some implementations and inserted between the outer extent of each leg assembly and the vehicle base to assist the tractive drive forces required to accomplish the heave and sway motions, but it will be understood by those skilled in the art without specific illustration.
Figure 9:
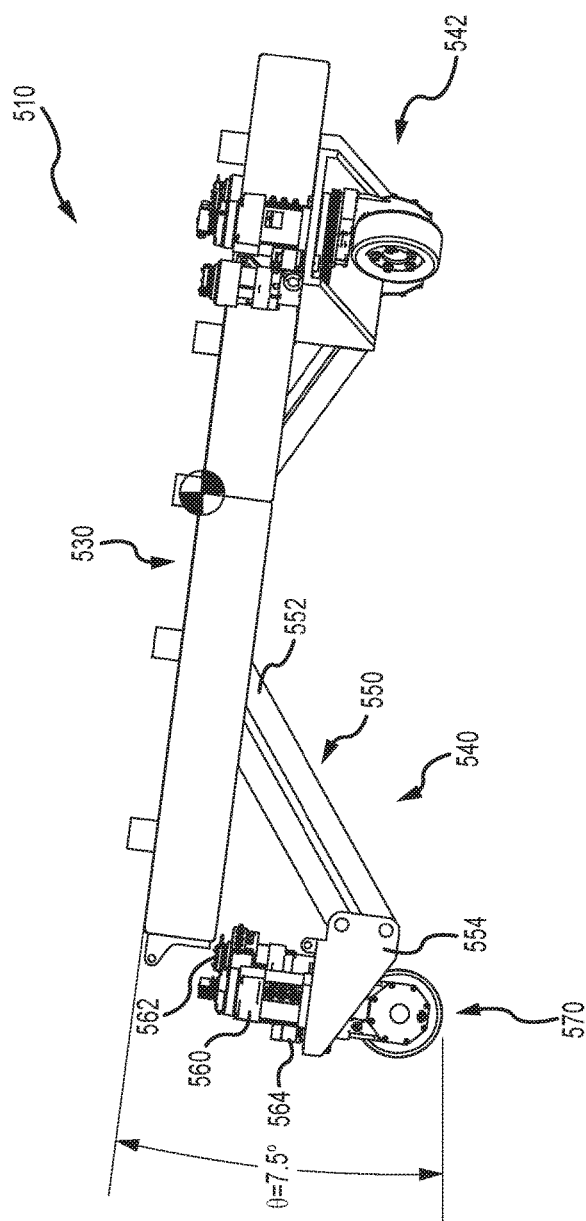

FIGS. 8 and 9 illustrate top perspective and side views, respectively, of the drive system 510 of FIGS. 5-7 after its operation to articulate or tilt the chassis 530 to a second position or orientation (e.g., to impart a sway motion to the chassis and, in a ride vehicle, a passenger compartment that would be supported by the chassis). In this simple example, the two leg assemblies 542, 544 are operated to not rotate their wheels or only rotate them a small amount inward or a greater amount "outward" or away from the wheel assembly 540 (as the chassis 530 may be moved or have translation concurrent with articulation to impart sway, such as to simulate a dance or ice skating-type motion). In contrast, the leg assembly 540 is operated so that the second drive motor 562 turns the wheel 570 inward to a 0-degree offset (or retains it here from its operating state shown in FIGS. 5-7).

Then, the first drive motor 560 is operated to rotate the wheel/castor 570 to move inward a distance toward the center axis of the chassis 530. This causes the leg/strut 550 to pivot about the end 552 and its pivotal coupling element/device 558. As a result, the subassembly 532 coupled with the leg end 552 of the leg assembly 540 is lifted upward, which causes the chassis 530 to be articulated to the tilt angle, θ, shown (e.g., a tilt in the range of 5 to 10 degrees such 7.5 degrees).

The examples of FIGS. 5-9 once understood explain how selective (concurrent and/or independent) control of three leg assemblies 540, 542, 544 can be used to provide sway and heave to the chassis 530 while also providing translation in any direction and providing rapid changes in direction (with operation of the second drive motors of these leg assemblies to set the offset angle of each wheel/castor (e.g., to provide drive steering)). When these movements are combined with those provided by a motion actuator (e.g., a multi-DOF actuator mechanism) supported on the chassis 530, a passenger compartment of a ride vehicle can be moved about a ride space with a wide range of motions including sway, heave, pitch, roll, and yaw as it is concurrently being moved through a ride space in a free ranging manner (e.g., without a track defining the ride path).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Several means are available to implement the systems and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors" (such as represented by processor 152 in the system 100 of FIG. 1). For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device (such as memory 170 of control system 150 in FIG. 1). Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions (such as those in control program 160 and its modules 162, 164 in FIG. 1) include, but are not limited to, computer-executable instructions executed by computer system processors and hardware description languages such as Very High Speed Integrated Circuit (VHSIC) Hardware Description Language (VHDL).

The invention claimed is:

1. A ride vehicle for an amusement park ride using free-ranging vehicles, comprising:
   a passenger compartment for receiving one or more passengers;
   a vehicle base supporting the passenger compartment; and
   a drive system with a support platform supporting the vehicle base,
   wherein the drive system is operable to selectively impart a set of motions to the vehicle base by imparting motions to the support platform,
   wherein the set of motions includes translational and cornering motions,
   wherein the drive system comprises first, second, and third leg assemblies each comprising a rigid, elongated leg pivotally coupled at an inner end to the support platform and supporting a wheel at an outer end, wherein the wheel is adapted for rotation about a vertical axis, and wherein the drive system further includes in each of the leg assemblies a drive motor for rotating the wheel about a vertical axis to define the translational and cornering motions.

2. The ride vehicle of claim 1, wherein the set of motions further include sway and heave.

3. The ride vehicle of claim 1, wherein the drive system further includes in each of the leg assemblies a drive motor for rotating the wheel about a central axis of the wheel to define a speed of the translational motion.

4. The ride vehicle of claim 3, wherein the drive motors of each of the leg assemblies are mounted on the outer end of the leg adjacent and vertically above the wheel.

5. The ride vehicle of claim 3, wherein the drive system further includes in each of the leg assemblies a battery set, for powering the drive motors, mounted on the leg between the inner and outer ends.

6. The ride vehicle of claim 3, wherein each of the drive motors in each of the leg assemblies are independently and concurrently operable to provide heave and sway to the passenger compartment via the support platform.

7. The ride vehicle of claim 1, wherein each of the legs extends outward from a center axis of the support platform and is offset from adjacent ones of the legs by 120 degrees.

8. The ride vehicle of claim 1, further comprising a motion actuator supported by the support platform and coupled to the vehicle base operable to selectively impart an additional set of motions to the vehicle base.

9. A ride vehicle, comprising:

a vehicle base supporting the passenger compartment; and a drive system with a support platform supporting the vehicle base, wherein the drive system is operable to selectively impart a set of motions to the support platform, wherein the second set of motions include translational motion in a plurality of directions and at least one of sway and heave, wherein the drive system comprises first, second, and third leg assemblies each comprising a rigid leg pivotally coupled at an inner end to the support platform and supporting a wheel at an outer end, wherein the wheel is adapted for rotation about a vertical axis, and wherein the drive system further includes in each of the leg assemblies a drive motor for rotating the wheel about a vertical axis to define the translational and cornering motions.

10. The ride vehicle of claim 9, wherein the drive system further includes in each of the leg assemblies a drive motor for rotating the wheel about a central axis of the wheel to define a speed of the translational motion.

11. The ride vehicle of claim 10, wherein the drive motors of each of the leg assemblies are mounted on the outer end of the leg adjacent and vertically above the wheel.

12. The ride vehicle of claim 10, wherein the drive system further includes in each of the leg assemblies a battery set, for powering the drive motors, mounted on the leg between the inner and outer ends.

13. The ride vehicle of claim 10, wherein each of the drive motors in each of the leg assemblies are independently and concurrently operable to provide heave and sway to the passenger compartment via the support platform.

14. A ride vehicle for an amusement park ride using free-ranging vehicles, comprising:

a passenger compartment for receiving one or more passengers;

a vehicle base supporting the passenger compartment; and a drive system with a support platform supporting the vehicle base, wherein the drive system is operable to selectively impart a set of motions to the vehicle base via the support platform, wherein the set of motions includes translational, sway, and heave motions, wherein the drive system comprises first, second, and third leg assemblies each comprising a rigid, elongated leg pivotally coupled at an inner end to the support platform and supporting a wheel at an outer end, wherein the wheel is adapted for rotation about a vertical axis, wherein the drive system further includes in each of the leg assemblies a drive motor for rotating the wheel about a vertical axis to define the translational and cornering motions, and wherein the drive system further includes in each of the leg assemblies a drive motor for rotating the wheel about a central axis of the wheel to define a speed of the translational motion.

15. The ride vehicle of claim 14, wherein the drive motors of each of the leg assemblies are mounted on the outer end of the leg adjacent and vertically above the wheel and further wherein the drive system further includes in each of the leg assemblies a battery set, for powering the drive motors, mounted on the leg between the inner and outer ends.

16. The ride vehicle of claim 14, wherein each of the drive motors in each of the leg assemblies are independently and concurrently operable to provide at least one of heave and sway to the passenger compartment via the support platform and wherein each of the legs extends outward from a center axis of the support platform and is offset from adjacent ones of the legs by 120 degrees.

17. A ride vehicle for an amusement park ride using free-ranging vehicles, comprising:

a passenger compartment for receiving one or more passengers;

a vehicle base supporting the passenger compartment; and a drive system with a support platform supporting the vehicle base, wherein the drive system is operable to selectively impart a set of motions to the vehicle base by imparting motions to the support platform, wherein the set of motions includes translational and cornering motions, wherein the drive system comprises first, second, and third leg assemblies each comprising a rigid, elongated leg pivotally coupled at an inner end to the support platform and supporting a wheel at an outer end, and wherein each of the legs extends outward from a center axis of the support platform and is offset from adjacent ones of the legs by 120 degrees.

18. The ride vehicle of claim 17, wherein the wheel is adapted for rotation about a vertical axis, wherein the drive system further includes in each of the leg assemblies a drive motor for rotating the wheel about a vertical axis to define the translational and cornering motions, and wherein the drive system further includes in each of the leg assemblies a drive motor for rotating the wheel about a central axis of the wheel to define a speed of the translational motion.

19. The ride vehicle of claim 18, wherein the drive motors of each of the leg assemblies are mounted on the outer end of the leg adjacent and vertically above the wheel.

20. The ride vehicle of claim 18, wherein the drive system further includes in each of the leg assemblies a battery set, for powering the drive motors, mounted on the leg between the inner and outer ends.

21. The ride vehicle of claim 18, wherein each of the drive motors in each of the leg assemblies are independently and concurrently operable to provide heave and sway to the passenger compartment via the support platform.

* * * * *